US009310986B2

(12) United States Patent  
Shogaki

(10) Patent No.: US 9,310,986 B2  
(45) Date of Patent: Apr. 12, 2016

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Yohei Shogaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 202 days.

(21) Appl. No.: 13/765,833

(22) Filed: Feb. 13, 2013

(65) Prior Publication Data

US 2013/0212525 A1    Aug. 15, 2013

(30) Foreign Application Priority Data

Feb. 15, 2012 (JP) ................. 2012-030819

(51) Int. Cl.
  G06F 3/048   (2013.01)
  G06F 3/0484  (2013.01)
  G06F 3/0483  (2013.01)
  H04N 1/00    (2006.01)

(52) U.S. Cl.
  CPC .......... G06F 3/04845 (2013.01); G06F 3/0483 (2013.01); H04N 1/00381 (2013.01); H04N 1/00411 (2013.01); H04N 1/00456 (2013.01); H04N 1/00469 (2013.01)

(58) Field of Classification Search
  CPC .............. G06F 3/04845; G06F 3/0483; H04N 1/00381; H04N 1/00411
  USPC .................................................. 715/784, 799
  See application file for complete search history.

(56) References Cited

U.S. PATENT DOCUMENTS

| 6,577,296 | B2* | 6/2003  | Flack ................... G06F 1/1626 345/157 |
| 7,836,388 | B2* | 11/2010 | McCall ................ G06F 3/0485 715/200 |
| 8,266,550 | B1* | 9/2012  | Cleron et al. ................. 715/863 |
| 8,606,297 | B1* | 12/2013 | Simkhai ................. H04W 4/02 455/456.2 |
| 2003/0182628 | A1* | 9/2003 | Lira ............................ 715/517 |
| 2006/0190833 | A1* | 8/2006 | SanGiovanni et al. ....... 715/767 |
| 2007/0038953 | A1* | 2/2007 | Keohane ............ G06F 3/04855 715/784 |
| 2007/0209017 | A1* | 9/2007 | Gupta .................. G06F 3/0485 715/781 |
| 2010/0192089 | A1* | 7/2010 | He ........................ G06F 17/218 715/784 |
| 2011/0055752 | A1* | 3/2011 | Rubinstein et al. .......... 715/784 |
| 2011/0179381 | A1* | 7/2011 | King ............................ 715/786 |
| 2011/0202837 | A1* | 8/2011 | Fong et al. .................... 715/702 |
| 2012/0324403 | A1* | 12/2012 | Van De Ven et al. ......... 715/863 |

FOREIGN PATENT DOCUMENTS

| JP | 2009-129020 A | 6/2009 |
| JP | 2011-095791 A | 5/2011 |
| JP | 2011-237636 A | 11/2011 |

* cited by examiner

*Primary Examiner* — Omar Abdul-Ali

(74) *Attorney, Agent, or Firm* — Canon USA, Inc. IP Division

(57) ABSTRACT

An image processing apparatus displays image data including a first area with significant information and a second area without significant information and moves an area to be displayed target from a part of an area to another part of the area according to a flick operation performed by a user in a state where the part of the area in the image data is displayed in a predetermined display area. If the first area is not included in the another part of the area to which the area to be displayed target is moved, the image processing apparatus performs control not to move the area to be displayed target to the another part of the area.

9 Claims, 6 Drawing Sheets

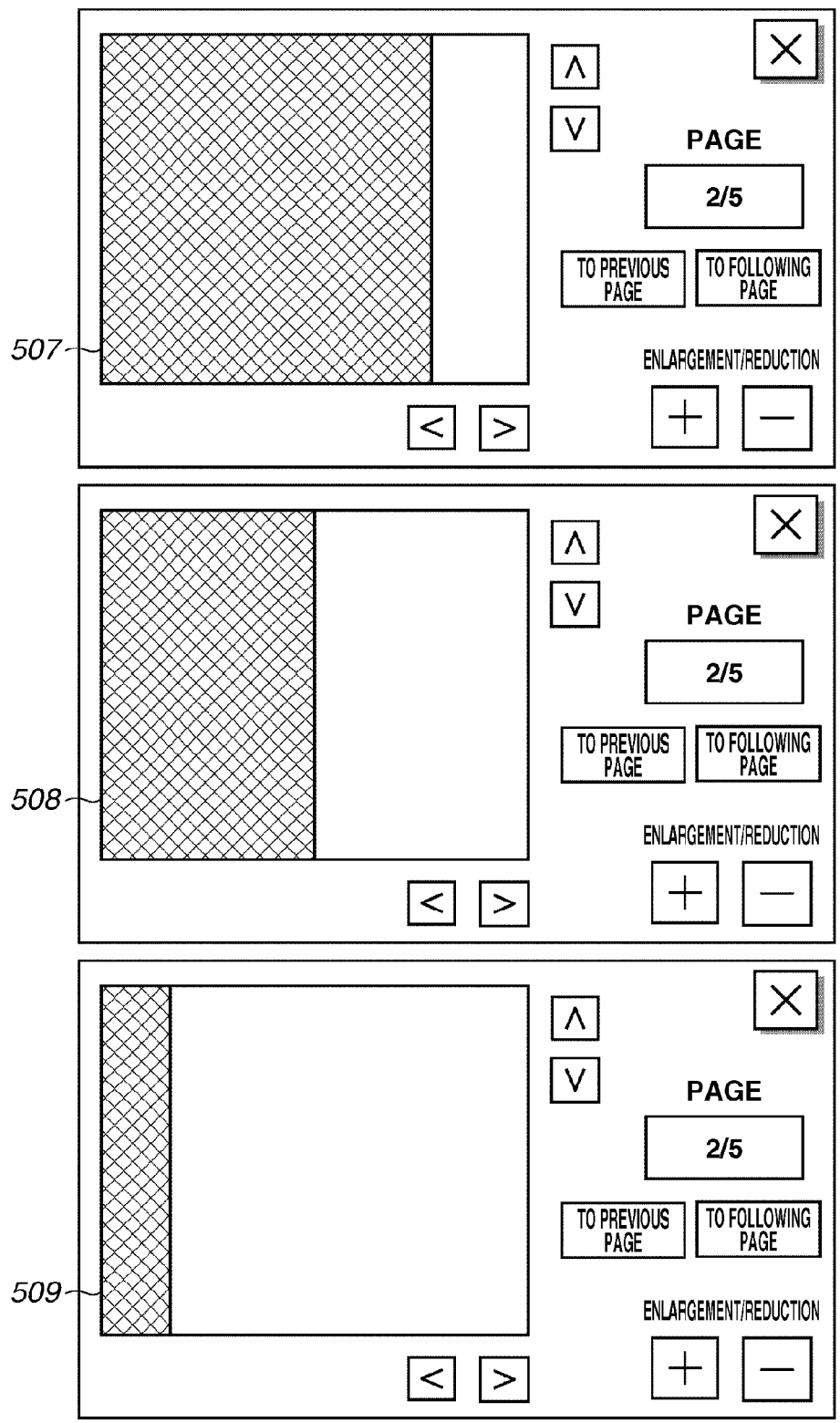

IMAGE PROCESSING APPARATUS, METHOD FOR CONTROLLING IMAGE PROCESSING APPARATUS, AND STORAGE MEDIUM

BACKGROUND OF THE INVENTION

1. Field of the Invention

The present invention relates to an image processing apparatus, a method for controlling the image processing apparatus, and a storage medium.

2. Description of the Related Art

In recent years, an information processing apparatus equipped with a touch panel has been in general use. When such an information processing apparatus is used, a flick operation is performed on a screen to scroll any image displayed on the screen.

Japanese Patent Application Laid-Open No. 2011-237636 discusses a technique in which a touch panel is provided on a display unit of a copying machine, a scanned image is previewed before printing, and a user flicking the touch panel allows for confirming each page while scrolling.

In the above technique images on a plurality of pages are displayed side-by-side and pages are scrolled by a flick operation. However, nothing is discussed about a scrolling display by the flick operation in a case where one page is enlarged and only a part thereof is displayed.

SUMMARY OF THE INVENTION

The present invention relates to a method for displaying an image when a user performs a flick operation in a case where only a part of the image is displayed and provides a further improvement in convenience to a user.

According to an aspect of the present invention, an image processing apparatus includes a display control unit configured to display image data including a first area with significant information and a second area without significant information and a movement control unit configured, in a state where the part of the area in the image data is displayed in a predetermined display area by the display control unit, to move an area to be displayed target from the part of the area to another part of the area according to a flick operation performed by a user, in which, if the first area is not included in the another part of the area to which the area to be displayed target is moved, the movement control unit performs control not to move the area to be displayed target to the another part of the area.

According to another aspect of the present invention, convenience to a user is further improved because an image is displayed in consideration of whether a displayed image includes significant information when a user performs operation such as a flick operation in a case where only a part of an image is displayed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B are examples in which preview is displayed according to the present exemplary embodiment.

DESCRIPTION OF THE EMBODIMENTS

Various exemplary embodiments, features, and aspects of the invention will be described in detail below with reference to the drawings.

The following exemplary embodiments do not limit the invention according to claims and all combinations of characteristics described in the exemplary embodiments are not necessarily essential for solving means of the present invention.

Figure 1:
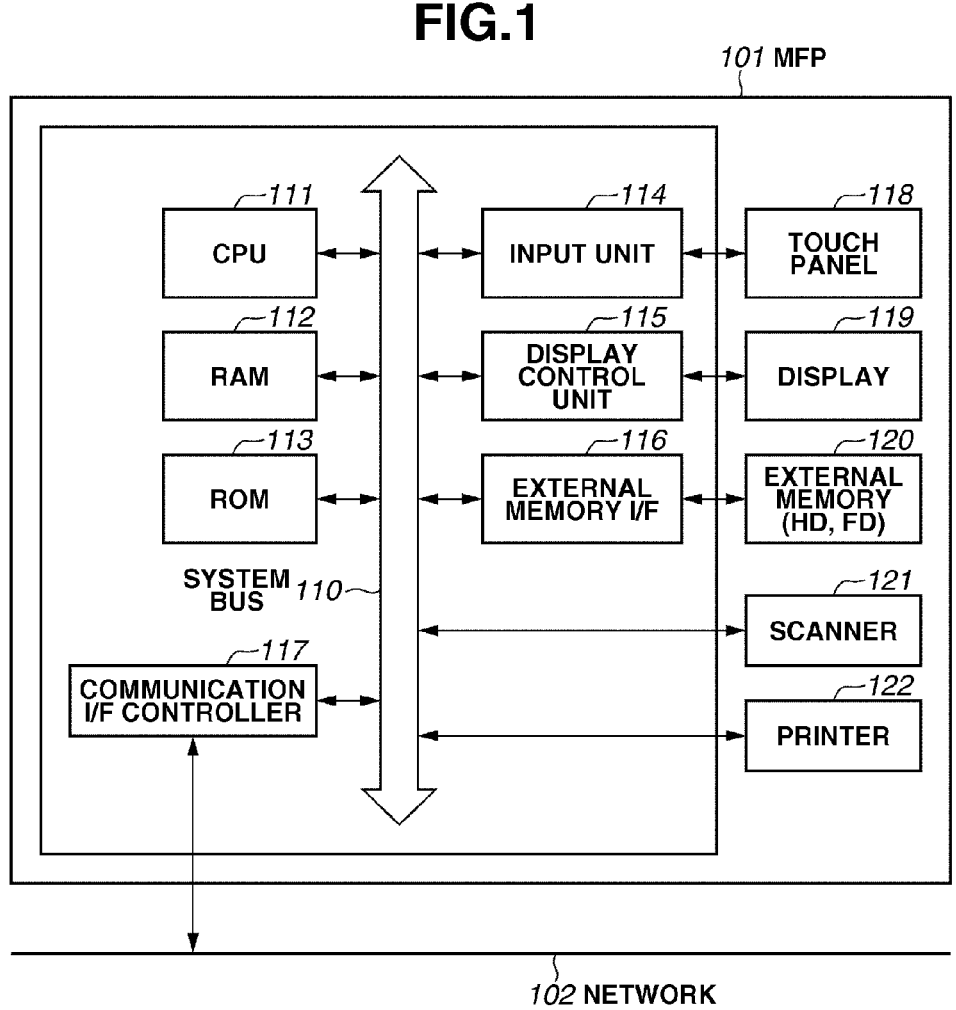
FIG. 1 is a block diagram of hardware of a multifunction peripheral (MFP) according to the present exemplary embodiment.

A first exemplary embodiment is described below. FIG. 1 illustrates a hardware configuration of a multifunction peripheral (MFP) as an example of an apparatus to which the present invention is applied.

In FIG. 1, a central processing unit (CPU) 111, a random access memory (RAM) 112, a read only memory (ROM) 113, an input unit 114, a display control unit 115, an external memory interface (I/F) 116, and a communication unit I/F controller 117 are connected to a system bus 110. Furthermore, a touch panel 118, a display 119, and an external memory 120 are connected. The units connected to the system bus 110 can transfer data each other via the system bus 110.

The ROM 113 is a nonvolatile memory for storing image data, other data, and various programs for operating the CPU 111 in predetermined areas thereof. The RAM 112 is a volatile memory used as a temporary storage area such as a main memory and a work area of the CPU 111. The CPU 111 controls the units of a MFP101 using the RAM112 as a work memory according to the program stored in the ROM 113, for example. The program for operating the CPU 111 may be stored not only in the ROM 113 but in an external memory (hard disk or others) 120.

The input unit 114 receives user operation, generates a control signal according to the operation, and supplies the control signal to the CPU 111. For example, the input unit 114 includes an input device for receiving the user operation such as a character information input device (not illustrated) such as a keyboard and a pointing device such as a mouse (not illustrated) or the touch panel 118. The touch panel 118 is an input device that outputs information about coordinates according to a position where a flatly configured input portion is touched. The CPU 111 controls the units of the MFP 101 according to the program based on the control signal generated and supplied by input unit 114 according to the user operation performed on the input device. This can operate the MFP 101 according to the user operation.

The display control unit 115 outputs a display signal for displaying an image to the display 119. For example, the display control unit 115 is supplied with a display control signal generated by the CPU 111 according to the program. The display control unit 115 generates the display signal based on the display control signal and outputs the display signal to the display 119. For example, the display control unit 115 causes the display 119 to display a graphical user interface (GUI) image for forming the GUI thereon based on the display control signal generated by the CPU 111.

The touch panel 118 is integrated with the display 119. For example, the touch panel 118 is configured so that light transmittance does not prevent the display 119 from displaying and the touch panel is attached to the upper layer of display surface of the display 119. An input coordinate on the touch panel 118 is caused to correspond to a display coordinate on the display 119. Thereby, the GUI can be configured as if the user can directly operate the screen displayed on the display 119.

The external memory 120 such as a hard disk, a floppy disk, a compact disk (CD), a digital versatile disc (DVD), or a memory card, for example, can be attached to the external memory I/F 116. Data are read from the attached external memory 120 or written in the external memory 120 based on the control of the CPU 111. The communication unit I/F controller 117 communicates with a local area network (LAN), the Internet, and various types of wired or wireless networks 102, for example, based on the control of the CPU 111. Various apparatuses such as a personal computer (PC), an MFP, a printer, and a server are connected to the MFP 101 in the network 102.

A scanner 121 reads a document to generate image data. A printer 122 executes print processing based on user instructions input via the input unit 114 or commands input from an external apparatus via the communication unit I/F controller 117.

The CPU 111 can detect the following operations performed on the touch panel 118 and states thereon: the touch panel 118 is touched with a finger or a pen (hereinafter referred to as touch-down); the touch panel 118 is kept touched with a finger or a pen (hereinafter referred to as touch-on); a finger or a pen is moving while touching the panel 118 with the finger or the pen (hereinafter referred to as move); a finger or a pen with which the touch panel 118 is touched is separated from the touch panel 118 (hereinafter referred to as touch-up); and noting touches the touch panel 118 (hereinafter referred to as touch-off).

The CPU 111 is notified via the system bus 110 of the above operations and a position coordinate where the touch panel 118 is touched with a finger or a pen. The CPU 111 determines what operation is performed on touch panel 118 based on the information of which the CPU 111 is notified.

For the move, the direction in which a finger or a pen moving on the touch panel 118 is moved can also be determined for each vertical or horizontal component on the touch panel 118 based on a change in the position coordinate. When the touch-down is performed and then the touch-up is performed through a constant move on the touch panel 118, this movement is regarded as drawing a stroke.

Hereinafter, the operation of quickly drawing a stroke is referred to as flick. The flick is an operation in which the finger is quickly moved on the touch panel 118 for some distance with the finger touching the touch panel 118 and removed from the touch panel 118. In other words, the flick is such a quickly sweeping operation that the touch panel 118 is flicked with the finger.

If the CPU 111 detects that the move is performed over a predetermined distance or longer at a predetermined speed or higher and then detects the touch-up, the CPU 111 detects that the flick is performed. If the CPU 111 detects that the move is performed over the predetermined distance or longer and then the touch-on remains detected, the CPU 111 determines that drag is performed. The touch panel 118 may use any method among various methods, such as a resistance film method, an electrostatic capacity method, a surface acoustic wave method, an infrared method, an electromagnetic induction method, an image recognition method, and an optical sensor method.

A preview function of the MFP 101 is described below. In the present exemplary embodiment, the preview function displays on the display 119 the image data stored in the external memory 120 or the RAM 112. The CPU 111 generates an image data of a format suited for display on the display 119 from the image data. Hereinafter, the image data of a format suited for display on the display 119 is referred to as a preview image. The image data stored in the external memory 120 may be formed of a plurality of pages. In this case, the preview image is generated for each page. The preview function can be applied not only to preview before printing by the printer 122 but also for confirmation of contents of image data.

The MFP 101 can store image data in the external memory 120 by using one or more methods. One method is to store the image data generated from the document read by the scanner 121. Another method is to store the image data received from an external apparatus such as a PC connected to the network 102 via the communication unit I/F controller 117. Still another method is to store the image data received from a portable storage medium (a Universal Serial Bus (USB) memory or a memory card) attached to the external memory I/F 116. The image data may be stored in the external memory 120 by other methods excluding the above ones. The displayed image data may include character information or image information such as a photograph or a graphic image, both character and image information, or other pieces of information.

Figure 2A:
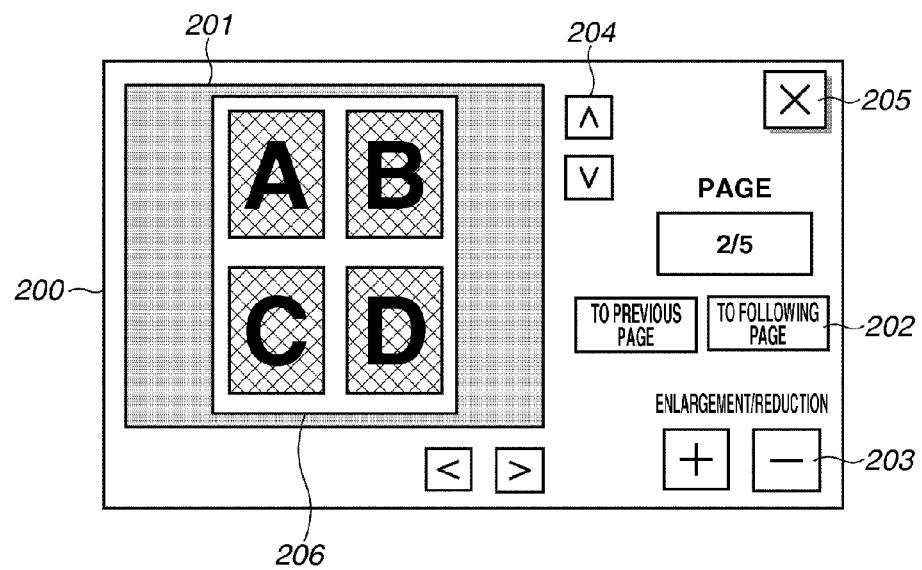
FIGS. 2A and 2B are examples of screens displayed on the MFP according to the present exemplary embodiment.
Figure 2B:
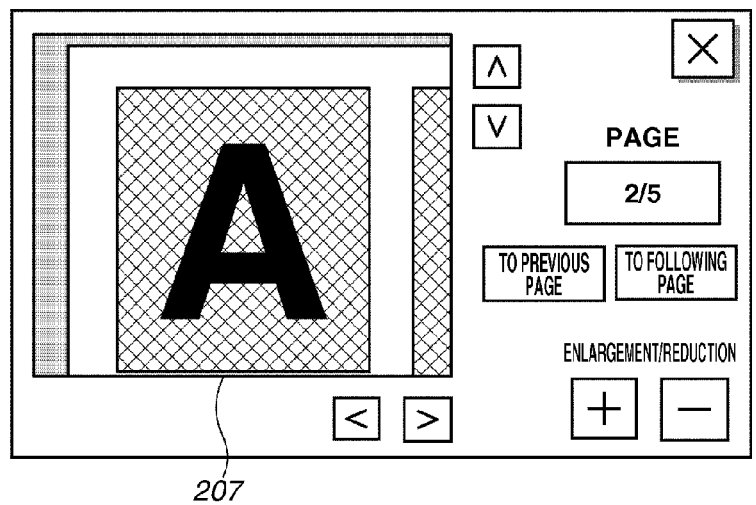

FIGS. 2A and 2B are examples that illustrate a state where a preview image is displayed on the display 119 of the MFP 101. A preview screen 200 in FIG. 2A displays the preview image and includes a preview display area 201, a page scroll button 202, a scaling button 203, a display area movement button 204, and a close button 205.

The preview display area 201 displays a preview image 206. In FIGS. 2A and 2B, one preview image (for one page) is displayed in the preview display area 201 as an example. In order to indicate that previous and following pages exist, preview images on the previous and following pages may be partially displayed in both ends of the preview display area 201. Alternatively, preview images on a plurality of pages may be displayed in the preview display area 201.

The page scroll button 202 can be pressed if a preview image on the previous or following pages exists. Pressing the page scroll button 202 allows the preview image 206 displayed in the preview display area 201 to be changed to a preview image on a page in the direction which the button pressed by the user indicates. The scaling button 203 changes the display magnification of the preview image 206 displayed in the preview display area 201.

The display magnification is segmented into a plurality of steps and can be changed to any display magnification by user instructions. The display area movement button 204 changes the display position of the preview image 206 displayed in the preview display area 201. In a case where the display magnification is increased by the scaling button 203, sometimes only a part of the preview image 206 is displayed in the preview display area 201. In such a case, any position of the preview image 206 can be displayed by the display area movement button 204. The close button 205 closes the screen of the preview screen 200 to shift the screen to another screen or ends the preview function.

The MFP 101 can operate the display of the preview image 206 by a predetermined gesture manipulation instead of the page scroll button 202, the scaling button 203, and the display area movement button 204. Other than the above flick and drag, the gesture manipulation includes a pinch-out operation in which the distance between two or more points on the touch panel is extended with the two or more points kept touched (in the touch-down state) and a pinch-in operation in which the distance therebetween is narrowed. Other operations may be used as the gesture manipulation instead of the above operations. The decision of whether to receive the gesture manipulation as a setting for determining the operation of the apparatus of the MFP 101 may be able to be changed. If setting is performed to receive the gesture manipulation, the page scroll button 202, the scaling button 203, and the display area movement button 204 may or may not be displayed.

The examples in FIGS. 2A and 2B illustrate preview image data subjected to a page aggregation setting, in which document images on a plurality of pages are reduced and arranged on one sheet. An arrangement of N-page document images on one sheet is referred to as an Nin1 layout. In other words, for example, an arrangement of 2-page document images on one sheet is referred to as 2in1 layout and an arrangement of 4-page document images on one sheet is referred to as 4in1 layout. The page aggregation setting of 2in1, 4in1, 6in1, and 8in1 layout can be made to the MFP 101 according to the present exemplary embodiment. The preview image 206 in FIG. 2A is an example in which the page aggregation setting of 4in1 is made to 4-page document images written as A, B, C, and D.

FIG. 2B illustrates an example in which the user presses the scaling button 203 to enlarge the preview image 206 in FIG. 2A. A preview image 207 in FIG. 2B is an enlarged one and only apart of the original preview image 206 (in this case, an upper left portion) is previewed. The enlargement and reduction of the preview image may be performed using the pinch-in or the pinch-out operation instead of using the scaling button 203. Specifically, the use of the pinch-out layout increases the display magnification to enlarge the displayed preview image 206. On the other hand, the use of the pinch-in layout decreases the display magnification to reduce the displayed preview image 206.

The following describes a control for moving a preview image in the display area by the flick operation of the user. In the present exemplary embodiment, the user can move the preview image in the display area while scrolling the preview image by performing the flick operation with the preview image touched with a finger or a pen instead of pressing the display area movement button 204.

If the CPU 111 of the MFP 101 detects the flick operation, the CPU 111 changes the contents in the preview display area 201. A change of display contents means that display moved from a first area displayed at present to a second area is performed. Here, the area indicates a part of the preview image. The position of the second area is determined based on the direction and strength of the flick operation. The strength of the flick operation is determined by the distance and speed of the move for the flick operation. Normally, the greater the strength of the flick operation, the greater the distance between the first and second areas. For the time from displaying the first area to displaying the second area, images on the line through the respective areas are scrolled and displayed.

A specific area included in the image data is described below. In the present exemplary embodiment, the specific area refers to an area included in the displayed image data and including data of at least a character or an image (such as a photograph, a graphic image, or a figure). On the other hand, an area included in the image data excluding the specific area does not include a character or an image and is considered a "blank area". The blank area may include information such as an isolated point and a noise image. In other words, the blank area is not completely blank but includes no significant information. Conversely, the specific area includes significant information such as a character or an image.

Figure 3A:
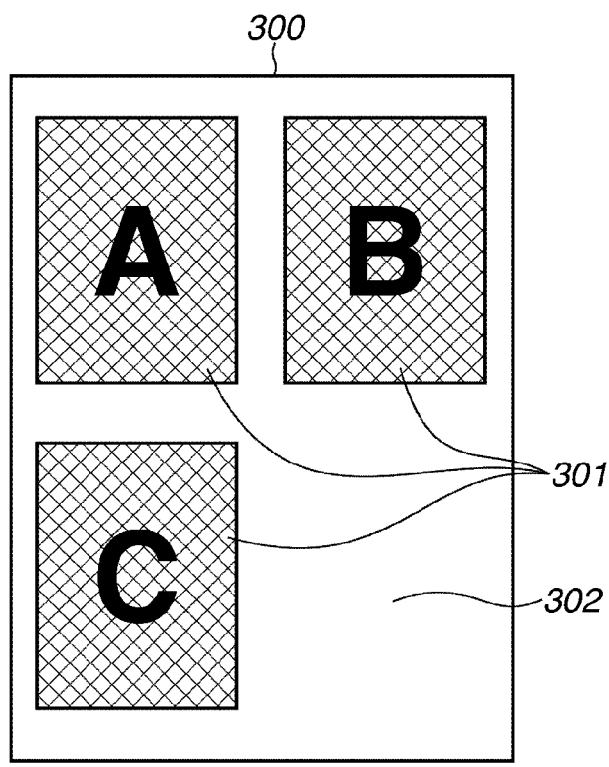
FIGS. 3A and 3B illustrate image data including specific area and blank area according to the present exemplary embodiment.

FIG. 3A illustrates one-page image data 300 generated when a three-page document image (pages A, B, and C) is subjected to the page aggregation setting of 4in1 layout. The image data 300 includes a specific area 301 and a blank area 302.

Figure 3B:
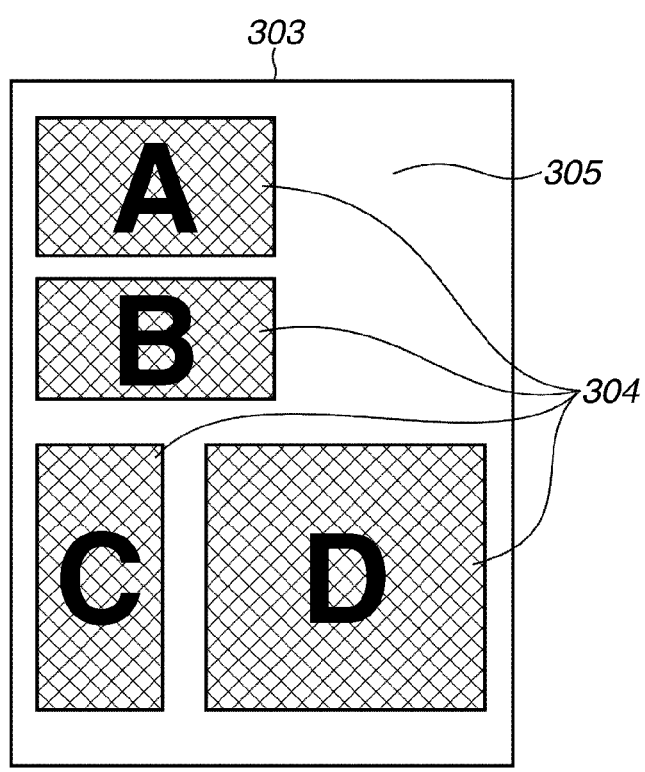

FIG. 3B illustrates one-page image data 303 in which four objects A, B, C, and D including a character or an image are optionally laid out. The image data 303 includes a specific area 304 and a blank area 305.

Thus, one-page image data includes an area (the areas 301 and 304, for example) normally including a character or an image and a blank area (does not include character or image data). The present exemplary embodiment presumes that particularly such image data (including an area having a character and an image and a blank area) are enlarged and displayed and a part thereof is displayed in the preview display area 201. In such a case, this prevents the area displayed in the image display area 201 from being a completely blank area. In particular, this prevents the area displayed in the image display area 201 from being a completely blank area in a case where display is changed from a part of one-page image data to another part of the one-page image data by the flick operation. The following describes in detail the process performed by the MFP 101.

Figure 4:
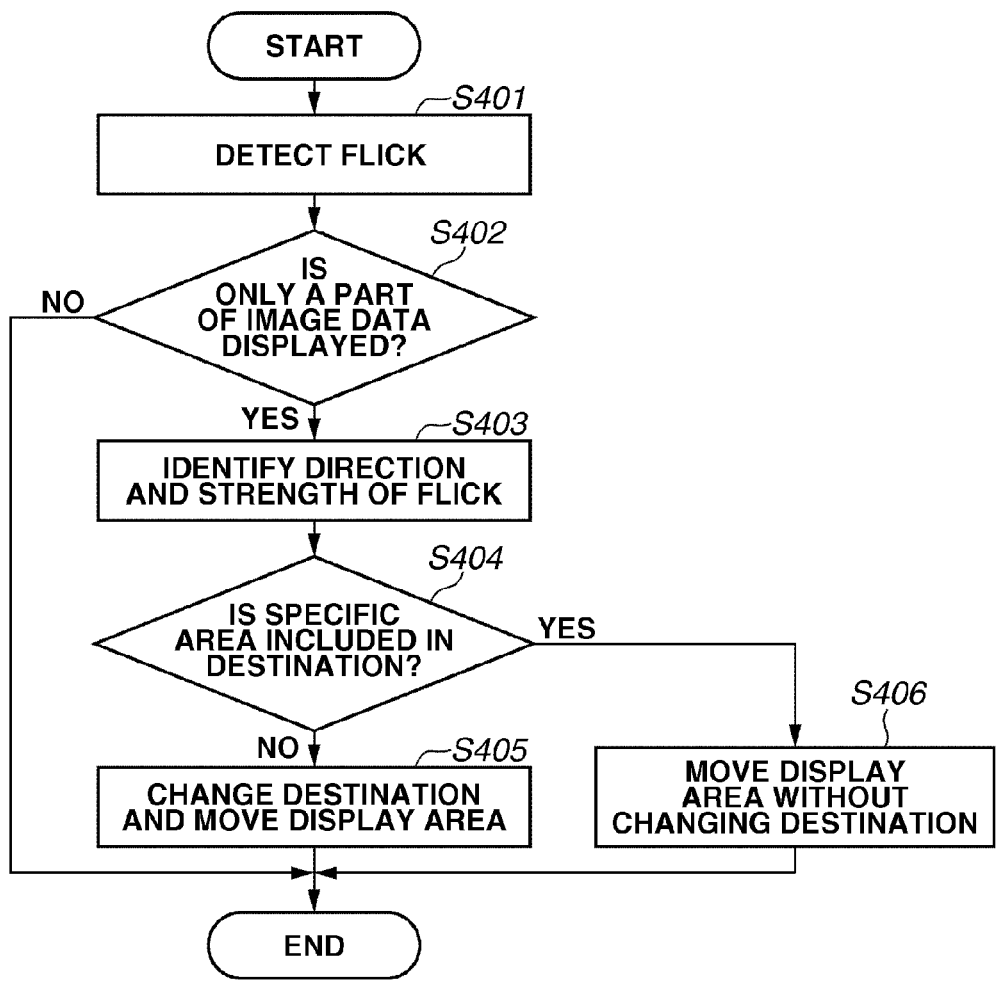
FIG. 4 is a flow chart illustrating the process in the MFP according to the present exemplary embodiment.

A flow chart in FIG. 4 illustrates a process executed by the MFP 101 when image data including the specific area and the blank area in one page are preview displayed. Each step in FIG. 4 is processed by the CPU 111 of the MFP 101 executing a program. The program is stored in a memory such as the ROM 113 and the external memory 120, loaded into the RAM 112, and executed.

In step S401, the CPU 111 detects the flick operation on the preview image displayed on the preview screen 200. In step S402, the CPU 111 determines whether a preview image currently displayed in the image display area 201 is displayed fitting inside the image display area 201 for a one page. In other words, the CPU 111 determines whether only a part of the one-page preview image is currently displayed in the preview display area 201. In other words, in step S402, the CPU 111 determines whether the current display state is indicated in FIG. 2A or FIG. 2B. If the CPU 111 determines that the preview image equivalent to the one-page does not fit inside the image display area 201 and only a part of the one-page preview image is displayed (YES in step S402), the processing proceeds to step S403. On the other hand, if the CPU 111 determines that the whole preview image equivalent to one-page fits and is displayed (NO in step S402), the display area is not moved in the page. In this case, preview images on a plurality of pages are scrolled to change a page taken as a preview page of the display target. This process is omitted in the flow chart illustrated in FIG. 4.

In step S403, the CPU 111 identifies the direction and strength of the flick operation detected in step S401. As described above, the direction of the flick can be identified from the coordinates of the touch-down and touch-up. The strength of the flick can be identified from the distance and speed of the move.

In step S404, the CPU 111 identifies a point (coordinate) of destination to be display target in the preview display area 201. The CPU 111 determines whether the display area of the identified destination is a completely blank area. In other words, the CPU 111 determines whether the specific area is included in the display area of the destination moved by the flick operation. As a result of the determination in step S404, if the CPU 111 determines that the specific area is included in the display area of the destination (YES in step S404), the processing proceeds to step S406. In step S406, the CPU 111 moves the display area to the identified destination.

On the other hand, as a result of determination in step S404, if the CPU 111 determines that the specific area is not included in the display area of the destination (NO in step S404), in other words, if the CPU 111 determines that the display area of the destination is a completely blank area, the processing proceeds to step S405. In step S405, the CPU 111 stops moving the display area to the identified destination. The CPU 111 determines whether the specific area is on a path in moving a display destination to the identified destination. As a result, if the specific area is on the movement path, in step S405, the display area is moved so that the specific area is included in the display area (so as to display the specific area).

At this point, not all of the specific area(s) on the movement path but at least a part thereof has been displayed. If there is a plurality of the specific areas on the movement path, the CPU 111 selects the specific area nearest to the destination identified in step S404 (the destination identified according to the flick operation) and moves the display area to display the specific area. Conversely, the CPU 111 may select the specific area farthest from the destination identified in step S404 (nearest to the present display area) or the user may select the specific area.

If there is no specific area on the movement path, it is configured so that the display area is not moved by performing the flick operation. Alternatively, if there is no specific area on the movement path, the processing proceeds to step S406 and the display area is moved to the destination identified in step S404. Only in this case, as a result of scroll display by the flick operation, is a blank area displayed in the whole image display area 201. Still alternatively, there may be no specific area on the movement path, but there can be the specific area in the movement direction. In other words, this is a case where the specific area exists on an extended line of the movement path. Therefore, the display area may be moved to an area where at least a part of the specific area existing in the movement direction is displayed.

If the display area is moved and stopped in step S405 or step S406, the processing of the flow chart is ended.

Eventually, the scroll display performed in step S405 has only to be moved so as to be stopped with at least a part of the specific area included in the display area, so that the display during movement until the scroll display is stopped may use any of the following. In one example of the display scroll is moved to a movement point, such as a final target place and stopped at the place without change. In this case, the user will feel as if the place is an original movement destination identified by the flick operation. In another example scroll is moved to an original movement destination determined by the direction and strength of the flick operation for the time being, in other words scroll is moved to a blank area for the time being, and then the scroll is moved to a movement point which is the final target place. In this case, the user easily recognizes that the movement destination identified by the flick operation is moved to a modified movement place because the movement destination is in a blank area.

Figure 5A:
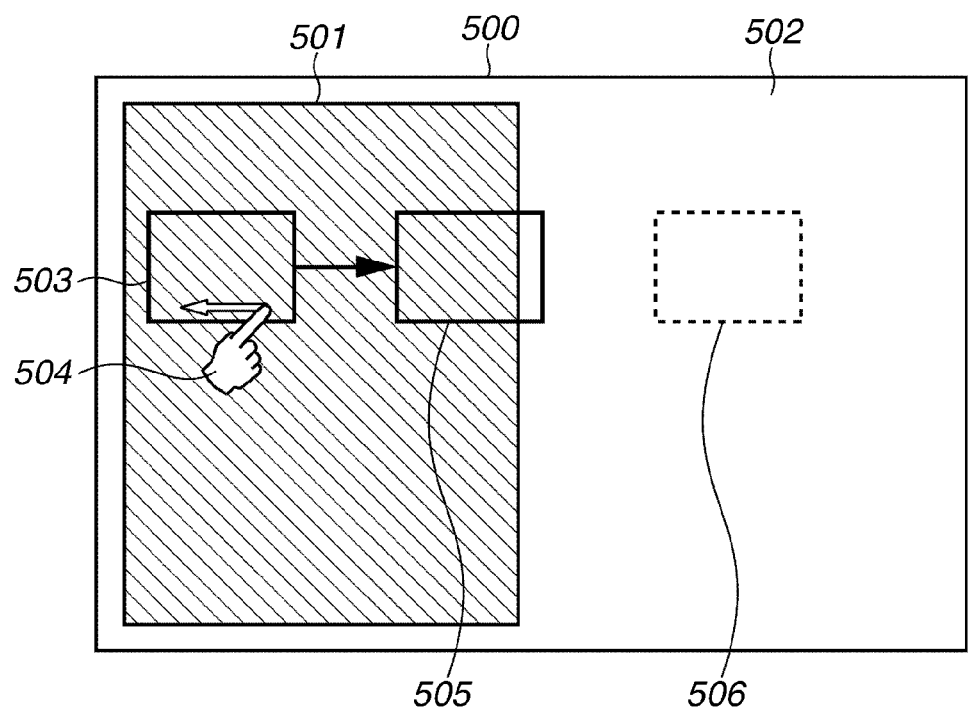

The following describes the processing according to the flow chart in FIG. 4 with reference to the specific examples in FIGS. 5A and 5B. FIG. 5A illustrates an image data 500 including a specific area 501 and a blank area 502 in one-page. A display area 503 indicates preview display area 201 on the preview screen. If the user performs a flick operation 504 in the left direction from a state where the display area 503 is displayed, the image data 500 is scrolled in the left direction, which means that the display area 503 is moved in the right direction with respect to the image data 500.

A display area at the movement destination identified by the flick operation 504 is assumed as a place 506. At this point, a blank area 502 is displayed in the entire display area 506. Therefore, as a result of determination in step S404, the processing proceeds to step S405. In step S405, the CPU 111 determines whether there is a specific area on the path along which the display area 503 moves to the display area 506. In this example, the CPU 111 determines that there is the specific area 501 thereon. As a result, the display area 503 stops moving to the display area 506 and moves to an area 505 including at least a part of the specific area 501.

Eventually, if at least a part of the specific area 501 is displayed in the image display area and the blank area is displayed in the other areas, the user can recognize that there is no significant information in the following area, so that the display content may be any of display content 507, 508, and 509. In other words, any of the following contents may be selected: the display content 507 in which the display area of the specific area>the display area of the blank area; the display content 508 in which the display area of the specific area=the display area of the blank area; and the display content 509 in which the display area of the specific area<the display area of the blank area.

The direction determined by the flick operation may be optional or may be corrected to a predefined direction. For example, a method may be applied in which the direction closest among the specific directions (selected from any of four directions, eight directions, and 16 directions) such as predefined longitudinal, transverse, and diagonal directions with respect to a calculated vector is selected and the elected direction is taken as the flick direction.

As described above, according to the present exemplary embodiment, if a state of displaying a part of image data for one-page is shifted to a state of displaying another part thereof by the flick operation, the area resultantly displayed in the image display area can be prevented from becoming a completely blank area. Thereby, the user can prevent meaningless information from being displayed to improve user convenience.

In the present exemplary embodiment, as described above, if the flick operation is performed, the area displayed in the image display area is prevented from becoming a completely blank area.

The user may desire to display a blank area depending on situations. For this reason, in the present exemplary embodiment, not only the above control is performed in the scroll of the display image by the flick operation, but also only the blank area may be displayed in a case of other gesture manipulations (such as drag operation, for example). Furthermore, only the blank area may be displayed by pressing the display area movement button 204 displayed on the preview screen 200 or depending on the operation of a scroll bar (not illustrated). In other words, depending on the method of operation or the type of the operation at the time of scrolling the displayed image, only the blank area may be enabled to be displayed, or may not be enabled to be displayed, as illustrated in FIG. 4.

Other exemplary embodiments will be described below. In the above exemplary embodiment, the image displayed on the display unit equipped with the touch panel is a preview image.

An image to be processed target according to the present invention is not limited to the preview image. The present invention is applicable to any case of displaying not only the preview image but also image data including the specific area and the blank area in one page.

In the description of the above exemplary embodiment, an MFP is cited as an example of an apparatus to which the present invention is applied. However, the apparatus to which the present invention is applied is not limited to the MFP. More specifically, the present invention is applicable not only to the MFP but also to image forming apparatuses such as a printing apparatus, scanner, facsimile (FAX), and digital camera and image processing apparatuses capable of processing at least image data including a PC and an information processing apparatus such as a mobile information terminal.

In the description of the exemplary embodiment, the flick operation is cited as an example of operation performed by the user to scroll. The present invention can be realized without limiting a user operation for scroll display to the flick operation. For example, if scroll display can be performed even by operation other than the flick on the touch panel, the present invention can be applied thereto. In other words, as long as the displayed image is scroll-displayed by a predetermined user operation, the present invention can be practiced. The predetermined operation may be other gesture operations performed by touching the touch panel than the flick operation on the touch panel and the gesture operation performed without touching the touch panel (free-space gesture operation: for example, gesture in free space is captured by a video camera and is recognized as a user operation). In regard to the display of an image to be scrolled, the image may be projected on any screen using an image projection apparatus such as a projector instead of displaying the image on the display unit equipped with the touch panel. The projected image may be scroll-displayed by performing a predetermined gesture operation (such as a free-space gesture).

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-030819 filed Feb. 15, 2012, which is hereby incorporated by reference herein in its entirety.

What is claimed is:

1. An image processing apparatus comprising:
a display control unit configured to display image data including a first area with significant information and a second area without significant information; and
a movement control unit configured, in a state where a part of an area in the image data is displayed in a predetermined display area by the display control unit, to move an area to be displayed target from the part of the area to another part of the area according to a flick operation performed by a user,
wherein, if the first area is not included in the another part of the area to which the area to be displayed target is moved, the movement control unit performs control not to move the area to be displayed target to the another part of the area.

2. The image processing apparatus according to claim 1, wherein, if the first area is not included in the another part of the area to which the area to be displayed target is moved, the movement control unit moves the area to be displayed target to an area where at least a part of the first area is displayed, the area existing in a path along which the area to be displayed target is moved from the part of the area to the another part of the area.

3. The image processing apparatus according to claim 1, wherein, if the first area is included neither in the another part of the area to which the area to be displayed target is moved nor in the path along which the area to be displayed target is moved from the part of the area to the another part of the area, the movement control unit moves the area to be displayed target to the another part of the area.

4. The image processing apparatus according to claim 1, wherein, if a part of the first area is not included in the another part of the area to which the area to be displayed target is moved, the movement control unit moves the area to be displayed target to an area where at least a part of the first area is displayed, the area existing in the direction in which the area to be displayed target is moved from the part of the area to the another part of the area.

5. The image processing apparatus according to claim 1, wherein, if the user performs drag operation in a state where a part of the area in the image data is displayed in a predetermined display area by the display control unit, the movement control unit moves the area to be displayed target to the another part of the area even if the first area is not included in the another part of the area to which the area to be displayed target is moved.

6. The image processing apparatus according to claim 1, wherein the image data is one-page image data including the first area with significant information and the second area without significant information.

7. The image processing apparatus according to claim 1, wherein the first area includes characters or image data and the second area is a blank area which does not include characters or image data.

8. A method for controlling an image processing apparatus, the method comprising:
displaying image data including a first area with significant information and a second area without significant information; and
performing movement control to move an area to be displayed target from a part of an area to another part of the area according to a flick operation performed by a user in a state where the part of the area in the image data is displayed in a predetermined display area by the displaying, wherein, if the first area is not included in the another part of the area to which the area to be displayed target is moved, the movement control performs control not to move the area to be displayed target to the another part of the area.

9. A storage medium storing a program for causing a computer to execute each step of the control method according to claim 8.

\* \* \* \* \*